Patented Mar. 9, 1926.

1,576,084

UNITED STATES PATENT OFFICE.

ALICE BROWN, OF SHELBURNE FALLS, MASSACHUSETTS.

PROCESS OF CRYSTALLIZING MAPLE-SUGAR CAKES.

No Drawing.   Application filed June 27, 1925.   Serial No. 40,107.

*To all whom it may concern:*

Be it known that I, ALICE BROWN, a citizen of the United States, residing at Shelburne Falls, in the county of Franklin and State of Massachusetts, have invented new and useful Improvements in Processes of Crystallizing Maple-Sugar Cakes, of which the following is a specification.

This invention relates to the process of crystallizing maple sugar cakes.

An object of the invention is to utilize or employ a process or method for crystallizing maple sugar cakes in order to prevent the cakes from becoming hard, discolored, honey combed, etc. Heretofore it has been found impossible to prevent maple sugar cakes from assuming the conditions just mentioned, with the result that it is impossible to satisfactorily market this product. I have discovered that these defects may be satisfactorily overcome by means of the process which consists of the following steps.

The cakes of maple sugar which are to be treated are preferably placed on wire racks, each rack to hold about one pound. Five of these racks or five pounds with the cakes thereon are then placed in a suitable container or receptacle. Next boil four gallons of maple syrup until a maple sugar thermometer, which is inserted therein, shows a temperature ranging from 224° to 228° F. When this temperature is reached it is allowed to cool to a degree ranging from 110° to 115° F. The syrup is then poured over the cakes on the racks and allowed to stand for about twelve hours. At the termination of this period the syrup is gradually drained from the container. After substantially all of the syrup has drained off the cakes are then taken from the wire racks and placed on paper to dry.

The process of treating cakes of maple sugar enables the same to retain their original hardness and color; prevents the cakes from becoming honey-combed; thus greatly improving the product as regards its keeping and selling qualities. This process has the effect of crystallizing the whole cake and forms practically a firm coating or shell.

It should be stated that the purpose of boiling the syrup at a temperature of 224–228° F. and then allowing it to cool is to make it thick enough in order to form the desired dry crystal coating for the cakes and thus prevent the cakes of maple sugar from becoming hard, discolored, or honey combed. The maple syrup however, in practice, is not allowed to become perfectly cold before using. As already stated it is cooled down to about 110–115° F. The hardness of the maple sugar cakes depends upon the length of time that the syrup is boiled. In practice the sap is boiled at a temperature of about 219° F. when it will make thick syrup. If boiling is continued it will make soft maple sugar when cooled. If boiled still more at 219° F. it will form hard sugar. And if it is boiled still more it will form very hard sugar when cold.

By flooding the cakes with a syrup that has been boiled at 224–228° F. the cakes are coated with a crystalline surface that thoroughly prevents the objections stated above. These temperatures have by practice found to be critical ones for the purpose.

What I claim is:

The process of crystallizing maple sugar cakes, which consists in first placing the cakes on wire screens, then inserting them in a container, then boiling maple syrup to a temperature of 224° to 228° F., then allowing the syrup to cool to 110° to 115° F., then pouring it over the cakes in the container and allowing the mass to set for about twelve hours.

ALICE BROWN.